United States Patent
Forsberg et al.

(10) Patent No.: US 7,767,283 B2
(45) Date of Patent: Aug. 3, 2010

(54) PACKAGES

(75) Inventors: Gunnar Forsberg, Askim (SE); Eugen Karl Mossner, Freibourg (DE); Graham M. Chapman, Niagra-on-the-lake (CA)

(73) Assignee: Add-X Biotech AB, Vastra Frolunda (SE)

( * ) Notice: Subject to any disclaimer, the term of this patent is extended or adjusted under 35 U.S.C. 154(b) by 376 days.

(21) Appl. No.: 11/624,756

(22) Filed: Jan. 19, 2007

(65) Prior Publication Data

US 2007/0243350 A1    Oct. 18, 2007

Related U.S. Application Data

(63) Continuation of application No. PCT/SE2005/001117, filed on Jul. 6, 2005.

(51) Int. Cl.
*B29D 22/00* (2006.01)
*B29D 23/00* (2006.01)
*B32B 1/08* (2006.01)

(52) U.S. Cl. ............... 428/35.7; 428/35.6; 428/500; 200/DIG. 30

(58) Field of Classification Search ............... 428/35.7, 428/35.2, 35.4, 35.6, 516, 517, 518, 520, 428/522, 476.1, 500; 383/1; 524/47, 52, 524/322
See application file for complete search history.

(56) References Cited

U.S. PATENT DOCUMENTS

| 4,038,228 | A |   | 7/1977  | Taylor      |         |
|-----------|---|---|---------|-------------|---------|
| 5,108,807 | A | * | 4/1992  | Tucker      | 428/35.2 |
| 5,258,422 | A |   | 11/1993 | Chang et al.|         |
| 5,565,503 | A |   | 10/1996 | Garcia et al.|        |
| 5,709,227 | A | * | 1/1998  | Arzonico et al. | 131/341 |
| 2003/0236325 | A1 |   | 12/2003 | Bonora   |         |

FOREIGN PATENT DOCUMENTS

| CN | 1487009    | 4/2004  |
| EP | 1359190    | 5/2003  |
| GB | 1052998    | 12/1966 |
| GB | 2220944    | 1/1990  |
| JP | 2000309658 | 11/2000 |
| JP | 2002-235013| 8/2002  |
| WO | 9404606    | 3/1994  |
| WO | 0059996    | 10/2000 |
| WO | 03050178   | 6/2003  |

OTHER PUBLICATIONS

"Additives to make conventional polymers degradable" Provided by www.specialchem4polymers.com, Oct. 25, 2005, pp. 1-7.
"Gjennombrudd og suksess for svensk bioteknikk" Provided by www.ibooks.com/moduler/skivervennling.cfm?dokid=14, Published Feb. 2003 1 page.
"Additives to make conventional polymers degradable" Provided by www.specialchem4polymers.com, Oct. 25, 2005, pp. 1-7.
"Gjennombrudd og suksess for svensk bioteknikk" Provided by www.ibooks.com/moduler/skivervennling.cfm?dokid=14, Published Feb. 2003 1 page.

* cited by examiner

*Primary Examiner*—Michael C Miggins
(74) *Attorney, Agent, or Firm*—Gauthier & Connors LLP

(57) ABSTRACT

The present invention relates to a package of a polyolefin polymer, wherein it comprises an addition of a pro-oxidant in the form of at least one salt of a metal of the group consisting of Mn, Fe, Cu, Co, and Ni, whereby the polyolefin is provided with a filler in the form of a mineral, such as calcium carbonate, such as talc, crushed marble, chalk, including nano particles thereof, calcite, silica, and nano particle clays, a filler in the form of natural fiber such as cellulose fiber, wood fiber, powderous wood or china grass, rice spelt, and starch.

8 Claims, No Drawings

PACKAGES

PRIORITY INFORMATION

The present application is a continuation of PCT Application No. PCT/SE2005/001117, filed on Jul. 6, 2005, and claims priority to Swedish Application No. SE 0401877-6, filed on Jul. 19, 2004. Both applications are incorporated herein by reference in their entireties.

TECHNICAL FIELD

The present invention relates to a polymer package material having restricted life-time by being self-destructive, said package substantially being made of polyolefins, such as polyethylene and/or polypropylene.

BACKGROUND OF THE INVENTION

The tobacco industry is attacked not only for the reason of selling a product being detrimental to health, but also for having a product where the consumers thereof spread waste packages, and product residues around.

Thus the packages of tobacco products are fairly complex, often consisting of an inner lining, an outer wrapping as well as an utmost, transparent protecting sheet.

The lining made of paper will become destructed fairly rapidly, while the outer wrapping and the transparent sheet, often made of polymeric material or coated with a polymeric material will become destructed more slowly, if thrown into the nature. Another piece of cigarettes being hard to destruct is the filter part, which can stay for very long times in the nature.

In some countries, in Sweden in particular, the habit of oral snuffing is quite common. The snuff is thereby marketed in snuffooxes, which previously were made of hard paper, or cardboard, but today such boxes are manufactured from polyolefins, such as polypropylene. The box as such is rather stiff and will hardly become destructed for a very long time when disposed off in the nature.

Modern snuffing, further, makes use of dosage packaged snuff, i.e., snuff is packed and administered in form of small bags made of a non-woven fibrous material allowing a penetration of the nicotine extract into the mouth cavity. However, "emptied" snuff bags are readily spat out, and will not become destructed by nature that easily, as well. The bags are made of non-woven fibrous polymers, in order to withstand the demands for mechanical durability while being wetted in the mouth cavity during extraction.

Thus the nature will become rather mixed up with tobacco product waste, which waste will become an environmental problem, at least from an esthetical point of view. This has been, and will be a problem to the industry.

In the present context a tobacco product package includes cigarette packages as described above, cigarette filters, snuffboxes, snuff bags, cigarillo packages, chewing tobacco packages, smoking pipe tobacco packages, packages for tobacco to be rolled, as well as cigar packages, although the later ones are less frequent than the former ones.

Most polymeric package materials can be retrieved in one or more of three basic ways, by recycling of the material, by biological decomposition of the material and by energy retrieval by using the material as a fuel.

In general packages of all kinds are often disposed off in the nature and cause an environmental problem. Or they are disposed off in nature as part of an organized compost program. In any case they are made subject to biological degradation by weather conditions, rain, ice; snow, heat and cold, by UV-irradiation, by microorganisms, by different creatures that can nourish from polymers and their rest products, by mechanical means, and other factors.

Most packages used today, are packages having a weight of up to around 20 g, independent of size, such as a number of different food packages. Among those are bags for carrying food and other house-hold articles, food packages as such, e.g., meat troughs, wrapping films, bags, and others, flower and plant pots and flower wrappings (often cast polypropylene film), vegetable wrappings (polyethylene and cast polypropylene films), bags for sweets and snacks.

In general polyolefins are used at the manufacture of such packages, such as polyethylene, polypropylene, poly vinyl acetate and polystyrene. The polymers can be produced in different ways, including being blown or expanded forms to provide a voluminous end product for insulating (impact or temperature) purposes.

Polymer Degradation and Stability 80 (2003) 39-43, I. Jakubowicz, "Evaluation of degradability of biodegradable polyethylene (PE)" discloses a study of thermo-oxidative degradation of polyethylene films containing pro-oxidant at three different temperatures, whereby the parameter oxygen concentration was varied as well. The paper discloses that polyolefins are hydrophobic hydrocarbon polymers, and thereby they are resistant to hydrolysis and can thus not be hydrobiodegradable. Polyolefins, as commercial products, are moreover resistant to oxidation and biodegradation due to the presence of anti-oxidants and stabilizers.

However, the polyolefins can be made oxobiodegradable by the use of pro-oxidant additives. Such pro-oxidants can be based on metal combinations capable of yielding two metal ions of similar stability and with oxidation number differing by one unit, e.g., $Mn^{2+}/Mn^{3+}$. The material will thereby degrade by a free radical chain reaction involving atmospheric oxygen. The primary products are hydroperoxides, which can either thermolyse or photolyse under the catalytic action of a pro-oxidant, leading to chain scission and the production of low molecular mass oxidation products such as carboxylic acids, alcohols, ketones and low molecular mass hydrocarbon waxes. Peroxidation leads also to hydrophilic surface modification; this is favorable to micro-organisms, which can then bio-assimilate the low molecular mass oxidation products. It is also stated that degradation in compost of PE that contained pro-oxidants could be very slow due to the low partial pressure of oxygen. The tests performed were carried out at temperatures of 50, 60, and 70° C. The paper shows that the films tested that the calculate lifetime for the materials, defined as time to achieve 10,000 molecular weight, and if assumed 25° C. as in-use temperature, then, using the determined activation energy it will be found that it will take about 4.5 years for one of the materials and about 2.5 years for one of the materials (containing the double amount of pro-oxidant) to reach this limit.

SUMMARY OF THE INVENTION

The present invention relates to a package of a polyolefin polymer, in particular tobacco packages, and in particular to destructible tobacco packages of polyolefins.

DETAILED DESCRIPTION OF THE PRESENT INVENTION

In particular the present invention relates to packages made by polyolefins, whereby the polyolefin(-s) has been made destructible by the addition of pro-oxidants to provide for a short destruction time when subjected to biological degradation and being subject to common weather conditions.

More particular the invention relates to a package of a polyolefin polymer, wherein it comprises an addition of a pro-oxidant in the form of at least one salt of a metal of the group consisting of Mn, Fe, Cu, Co, and Ni, whereby the polyolefin is provided with a filler in the form of a mineral, such as calcium carbonate, such as talc, crushed marble, chalk, including nano particles thereof, calcite, silica, and nano particle clays, a filler in the form of natural fiber such as cellulose fiber, wood fiber, powderous wood or china grass, rice spelt, and starch.

According to a preferred embodiment the polyolefin is polypropylene.

According to a preferred embodiment the polyolefin is polyethylene.

According to a preferred embodiment the metal salt is a carboxylate.

According to a preferred embodiment the carboxylate is selected from the group consisting of a stearate, an oleate, a palmitate or mixtures thereof.

According to a preferred embodiment the package is an injection or thermo moulded snuff box.

According to a preferred embodiment the package is snuff pod composed of a non-woven fibrous material.

According to the invention starch is used as a filler material as well. Thereby the starch may be 1 to 30% by weight of the pro-oxidant additive and up 60% by weight of the total polymer. The starch may be different types of starch but most often corn starch which has turned out to have excellent properties in polyolefin polymers. The starch may also have been pre-treated and become a thermoplasticized starch, a plastic starch, or a glycerol and water treated starch.

Starch is the major chemical constituent of a cereal plant. Concentrated in the grain in the form of granules, it is the result of the transformation of sugar by amyloplasts.

Corn dominates as starch raw material (83%), followed by wheat (6%), potato (6%), tapioca (4%), and other crops—mainly rice (1%).

Blending starch with commodity plastics will create a product which is more sustainable than a mere polyolefin product as less polymer, (polyolefins) is being used.

Starch has thermoplastic properties that are released when the native granule is broken down in the presence of a solution (plasticizer) in a thermo-mechanical environment. As a result of this breakdown, a homogeneous mix of ThermoPlastic Starch (TPS) is obtained that can be shaped using standard plastic forming methods with similar properties to the plastics.

In a mixture with a polyolefin like PE the starch will break down but not the remaining PE, which is not biodegradable. If AddiFlex is mixed into the blend the PE will also start to biodegrade in the presence of temperature, oxygen and or UV-light.

Particle size of the starch granulate is from nano size (nm) to hundreds of micrometer (my).

According to a preferred embodiment the package is a cigarette package.

According to a preferred embodiment the package is a cigarette filter.

According to a preferred embodiment the package is a smoking tobacco package in the form of a foldable bag.

One major advantage of the present invention is that any package can be recycled, be biologically degraded or be energy retrieved by burning. Thus the package is not restricted one single recycling way.

The invention will be described more in detail in the following, however, without being restricted thereto, with reference to the examples given.

A snuff box is made of polypropylene and has the following typical measurements in mm:
Bottom 0.7 to 1.0
Injection dome 0.6 to 0.9
Main rim 1.0 to 1.5
Seal rim overlap 0.45 to 0.65
Lid 0.65 to 0.95
Lid cover 0.90 to 1.35
Link part 2.00 to 2.50 (container in the lid for storing used pods)

A snuff pod (bag) non-woven material of polypropylene (PP) has the following typical details:

| | |
|---|---|
| PP (PP spun fibre) (incl. colour master batch) | 69-74 (%), |
| AddiFlex ® (pro-oxidant mixture) | 6 (%) and |
| Calcium carbonate (filler) such as OMYALENE ® | 25 (%) |
| A typical cigarette filter consists of Polymer | 69-74 (%), |
| AddiFlex ® (pro-oxidant mixture) | 6 (%) and |
| Calcium carbonate such as OMYALENE ® | 25 (%) |

As an alternative to above wood fibres/cellulose can be added as follows

| | |
|---|---|
| PP (incl. colour master batch) | 44% by weight |
| AddiFlex ® | 6% (w/w) |
| OMYALENE ® | 25% (w/w) |
| Wood-Granulate (Cellulose) | 25% (w/w) |

AddiFlex® is a trade mark used by Add-X Biotech AB, Sweden. OMYALENE® is a trade mark used by Omya AG, Switzerland.

Another composition can be as follows:

| | |
|---|---|
| PP (incl. colour master batch) | 44% by weight |
| AddiFlex ® | 6% (w/w) |
| Starch, thermoplasticized | 50% (w/w) |

AddiFlex® is a trade mark used by Add-X Biotech AB, Sweden. OMYALENE® is a trade mark used by Omya AG, Switzerland.

The pro-oxidant mixture, the AddiFlex® of the above composition, comprises the following

| | % by weight |
|---|---|
| Metal salts (i.a. carboxylates of Fe, Mn, Co or Cu) | 0.5-15 |
| Starch | 1.0-30 |
| $CaCO_3$ | 2.0-50 |
| Polymer (PE or PP) | 25-85 |

The pro-oxidant mixture or additive can be mixed with the main polymer base in a proportion of 1-25%, thus in the example above having 6% of additive, the amount of metal salt is about 0.03% to 1%.

The calcium carbonate as well as the starch component may be conditioned or pre-compounded in order to mix better. The wood fiber, powderous wood or cellulose fiber may be pre-compounded as well.

More generally, the following can be mixed into the final mixture

|  | % by weight |
| --- | --- |
| $CaCO_3$ | 10-70 |
| Wood fiber/cellulose | 10-80 |
| Starch | 1-60 |
| Polyolefin | 25-85 |

The starch increases the decomposition of the polymer article initially.

The polymers, PE and PP, can be injection molded or thermo formed for the manufacture of snuff boxes, or be spun to form a fiber for non-woven fiber pods.

The polymer materials of the present invention can be used in any forming method, such as injection moulding, form moulding, thermo moulding, film casting, blow moulding, cold moulding, bag moulding, vacuum thermoforming, compression moulding, slot-die extrusion or span forming.

The polymer package consisting of polymer, calcium carbonate and pro-oxidant (metal carboxylate) will have a very rapid ageing as evident from the table below.

The present polymer packages are not only subject to a thermo oxidative degradation, but will also be subject to UV irradiation degradation. Some of the pro-oxidants disclosed above will become initiated by UV-light and be supported by UV-light in their oxidative reaction to decompose the polymers.

In the case a cellulose fiber is used as well, the ageing will have still more serious impact on the mechanical strength.

It is evident that the polymer package of the invention will break down fairly rapidly at higher temperatures, such as those temperatures present in commercial compost plants, where temperatures between 40 to 80° C. are quite common.

The invention claimed is:

1. A single layer biodegradable package made from a composition comprising:
   i) 25-85% (w/w) polyolefin polymer,
   ii) 6% (w/w) pro oxidant comprising 0.5-15% by weight carboxylates of Fe, Mn, Co or Cu, 1.0-30% by weight starch, 2.0-50% by weight $CaCO_3$ and 25-85% by weight polyethylene or polypropylene,
   iii) 10-70% (w/w) Calcium Carbonate; and
   iv) 10-80% (w/w) of a filler in the form of natural fiber; and wherein said composition has been shaped into a rigid package.

Screening Test - PP + AddiFlex + Omyalene
Influence on break down period
Injection moulding

|  |  |  | Formulation | | | | |
| --- | --- | --- | --- | --- | --- | --- | --- |
|  |  |  | 1 | 3 | 4 | 6 | 13 |
|  | g/cm³ |  |  |  |  |  |  |
| Polypropylene | 0.905 |  | 97 | 93 | 87 | 63 | 100 |
| Addiflex | 1.000 |  | 3 | 7 | 3 | 7 |  |
| OMYALENE | 2.160 |  |  |  | 10 | 30 |  |
| DENSITY OF THE MIXTURE | g/cm³ |  | 0.91 | 0.91 | 0.96 | 1.10 | 0.91 |
| SPECIFICATION ORIGINAL | DIN | UNIT | Sample DIN 53 455 1:4 | | | | |
| FLEXURAL MODULUS, TENSILE, provisional | 527 | ISO N/mm² | 1205 | 1297 | 1373 | 1594 | 1257 |
| TENSILE STRENGTH AT YIELD | 527 | ISO N/mm² | 39 | 38 | 36 | 32 | 39 |
| ELONGATION AT YIELD | 527 | ISO % | 9 | 7 | 8 | 5 | 9 |
| TENSILE STRENGTH | 527 | ISO N/mm² | 46 | 43 | 40 | 32 | 47 |
| PERCENTAGE ELONGATION | 527 | ISO % | 559 | 471 | 480 | 5 | 568 |
| TENSILE STRENGTH AT BREAK | 527 | ISO N/mm² | 45 | 43 | 39 | 28 | 47 |
| ELONGATION AT BREAK | 527 | ISO % | 563 | 475 | 483 | 291 | 572 |
| MECHANICAL PROPERTIES AFTER AGEING OVEN 80° C./8 DAYS | | | | | | | |
| FLEXURAL MODULUS, TENSILE (=.05-0.25%) | 53 457 | DIN N/mm² | 1336 | 1413 | 1505 | 1584 | 1340 |
| TENSILE STRENGTH AT YIELD | 527 | ISO N/mm² | 42 | 41 | 40 | 32 | 43 |
| ELONGATION AT YIELD | 527 | ISO % | 10 | 7 | 7 | 8 | 9 |
| TENSILE STRENGTH | 527 | ISO N/mm² | 42 | 41 | 40 | 32 | 43 |
| PERCENTAGE ELONGATION | 527 | ISO % | 10 | 7 | 7 | 8 | 158 |
| TENSILE STRENGTH AT BREAK | 527 | ISO N/mm² | 29 | 32 | 31 | 27 | 36 |
| ELONGATION AT BREAK | 527 | ISO % | 198 | 81 | 75 | 41 | 286 |

As evident from the Table above the ageing for 8 days at 80° C. will seriously change the mechanical properties of the polymer, but in particular the polymer having been provided with calcium carbonate and pro-oxidant has gone through a marked change in elongation breakdown as well as percentage elongation. After thermo oxidative ageing the polymer has lost almost all of its polymeric character.

2. A package according to claim 1, wherein the polyolefin is polyethylene.

3. A package according to claim 1, wherein the filled is of the group comprising cellulose fiber, wood fiber, powdered wood or china wood and rice spelt.

4. A package according to claim 1, wherein the composition has been shaped into a package by injection molding, for molding thermo molding blow molding, cold molding, vacuum thermoforming compression molding slot-die extrusion or span forming.

5. A package according to claim 1, wherein the polyolefin is polypropylene.

6. A package according to claim 5, wherein the polypropylene is present in an amount of 44% (w/w).

7. A package according to claim 1, wherein the composition further contains 1-60% starch.

8. A package according to claim 7, wherein the starch is present in an amount of 50% (w/w).

* * * * *